J. B. JOHNSON.

Assignor, by mesne assignments, of one-half interest to A. FULLER.

Machine for Shaping the Soles of Boots and Shoes.

No. 8,776. Reissued June 24, 1879.

*Witnesses.*
Georgii.
A. P. Pabst

*Inventor.*
Joseph B. Johnson.
by M. Bailey attorney

2 Sheets—Sheet 2.

J. B. JOHNSON.

Assignor, by mesne assignments, of one-half interest to A. FULLER.

Machine for Shaping the Soles of Boots and Shoes.

No. 8,776. Reissued June 24, 1879.

*Witnesses.*
J. D. Bridge
L. Humewell.

*Inventor*
Joseph B. Johnson.
by W. Bailey attorney

UNITED STATES PATENT OFFICE.

JOSEPH B. JOHNSON, OF LYNN, MASSACHUSETTS, ASSIGNOR, BY MESNE ASSIGNMENTS, OF ONE-HALF INTEREST TO ARTHUR FULLER.

IMPROVEMENT IN MACHINES FOR SHAPING THE SOLES OF BOOTS AND SHOES.

Specification forming part of Letters Patent No. 75,428, dated March 10, 1868; Reissue No. 8,776, dated June 24, 1879; application filed February 10, 1879.

*To all whom it may concern:*

Be it known that I, JOSEPH B. JOHNSON, of Lynn, in the State of Massachusetts, have invented certain new and useful Improvements in Machines for Beating Out the Soles of Shoes or Boots, the same being fully described in the following specification and in the accompanying drawings, of which—

Figure 1:
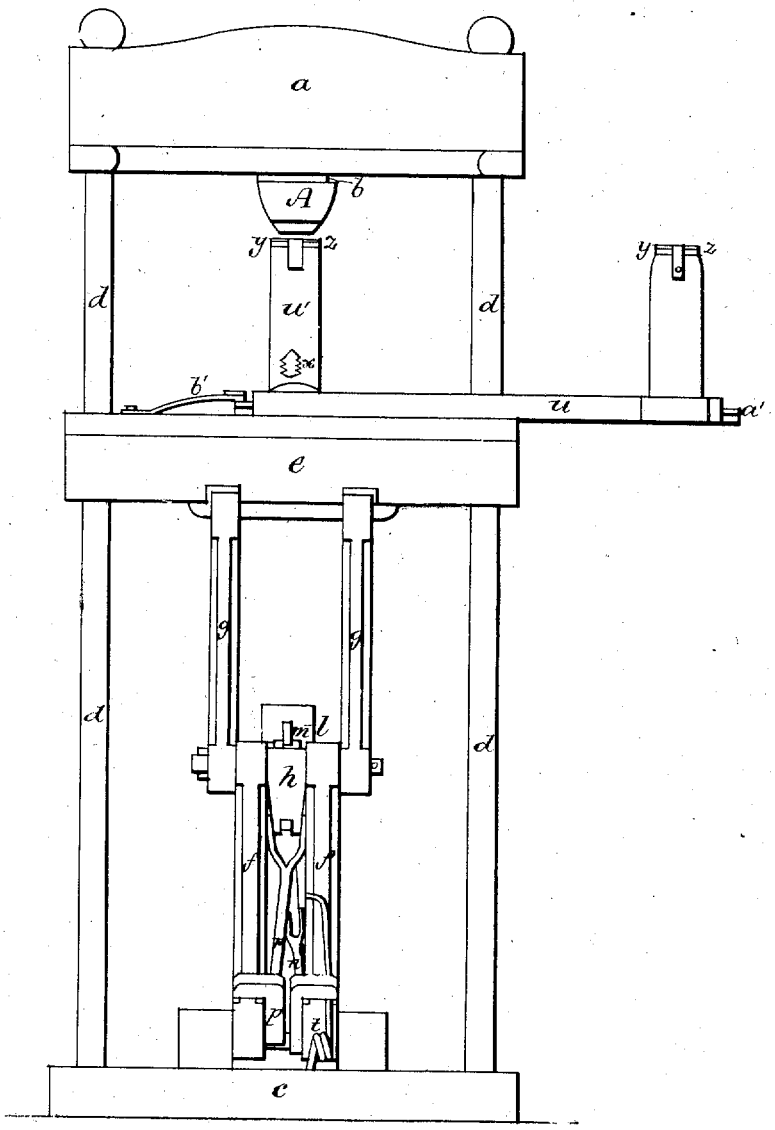
Figure 2:
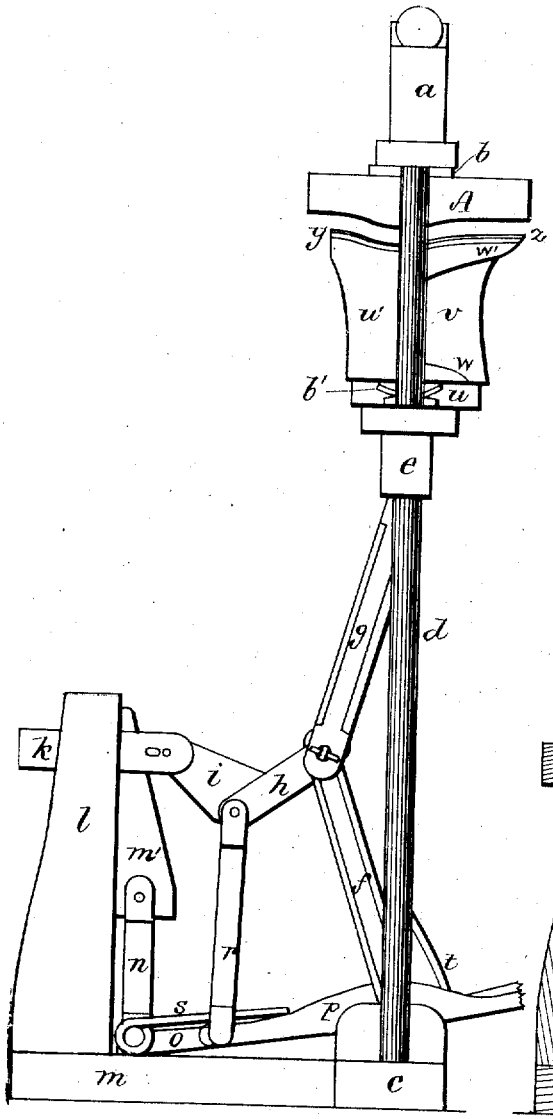
Figure 3:
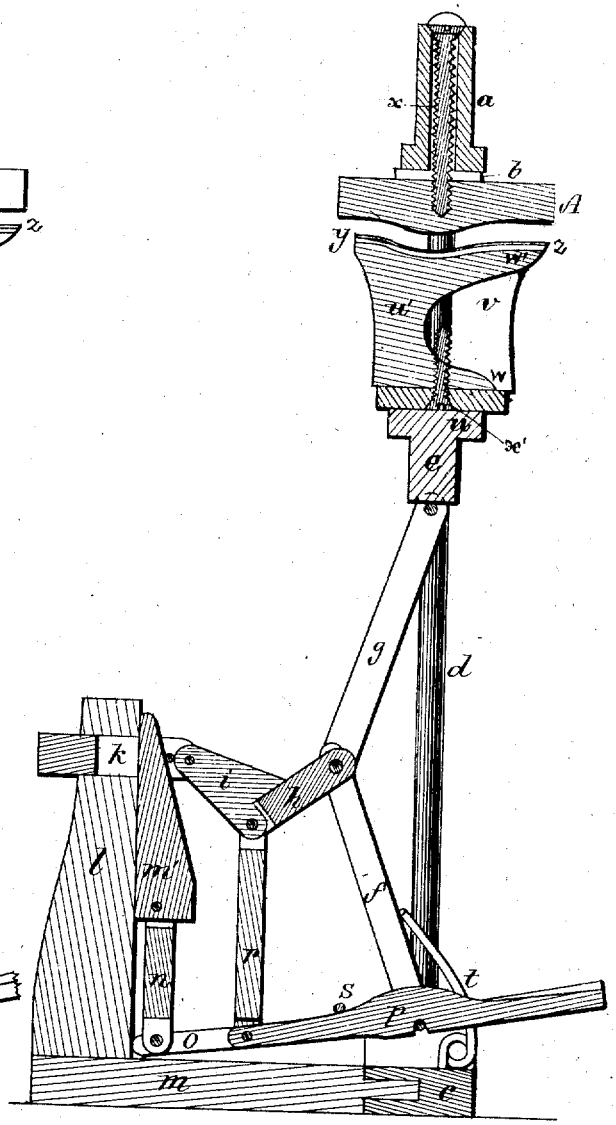

Figure 1 denotes a front elevation; Fig. 2, a side elevation, and Fig. 3 a vertical and transverse section.

The present machine may be said to be an improvement with reference to the subject of Letters Patent granted to me November 26, 1867.

My invention consists, principally, in adapting a last, suitably supported, not only to receive a powerful pressure, but to be easily withdrawn therefrom and from the mold, to enable a shoe to be removed from the last and another placed upon it.

In the drawings, A denotes the sole-mold, which, in this instance, is connected with the head *a* of a press by a screw, *x*, there being between the head and the mold a plate, *b*, of vulcanized india-rubber, against which the mold bears. The screw goes through a hole in the head somewhat larger than the diameter of the screw, so that with the aid of the elastic bearing the mold may conform itself to a sole under pressure. The head *a* is arranged above a base-bar, *c*, and is connected therewith by two parallel and vertical rods, *d d*, as represented. A bed, *e*, extends between the two rods, and is fitted to them so as to be capable of sliding vertically freely toward and away from the head. This bed is connected with the bar *c* by a system of toggles, *f f g g*, which, at their central joint, are connected with a pair of auxiliary toggles, *h i*, which are jointed to a bar, *k*, which is supported by and slides freely within a vertical post, *l*, extended upward from an arm, *m*, projecting horizontally from the middle of the base-bar *c*. A wedge, *m'*, is extended through a vertical slot in the bar *k*, and by means of a pitman, *n*, is joined to a treadle-lever, *o*, arranged as represented. The auxiliary toggles, at their middle joint, are connected with another such treadle-lever, *p*, by a pitman, *r*. A spring, *s*, fixed to the arm *m*, and having its free end resting on the rear arms of the two treadle-levers, operates to depress either or both of them, as circumstances may require. Another spring, *t*, bearing against the lower of the main toggles, serves to throw such toggles back or out of line with each other.

The last *u'* has a base extended from beneath the heel toward the toe, which serves to receive and resist pressure. It rests on a support, *u*, connected with the bed *e* of the machine, its primary object being to carry the last to position beneath the mold, and to enable it to be withdrawn at the will of the operator. This support will, by a revolving or an alternating movement thereof, place the last under the mold and withdraw it therefrom, to enable the pressed shoe-sole to be removed. As the support rests on the bed *e*, and is capable of being revolved horizontally on center or axis *d*, I am enabled, by making it of a length necessary for the purpose, to use a last, *v*, as an auxiliary to the main last *w'*, so that while a shoe on the main last is under pressure another may be placed on the auxiliary last.

In connection with the support there is a stud, *a'*, which operates with a spring-latch, *b'*, on the bed *e*, in such position with respect to the mold as to lock the last in its proper position to receive pressure. Each last is provided on its sole with an elastic facing, as shown in the drawings, consisting of a seat or cushion, *y*, of india-rubber, over and upon which is a thin metallic plate, *z*, having the form of a sole.

The advantage of having the last so applied to the support as to be capable of being revolved on an axis falling vertically through the last, or extending from it, is that it enables the workman, prior to the removal of a shoe from the last, to turn the latter about into the most convenient position for effecting such removal. The employment of the wedge, the slotted slide-bars, and auxiliary treadle with the two sets of toggle-jointed levers and their pitman and operative treadle enables the operator to regulate by his foot the amount of pressure exerted by the toggles on the last and mold.

I claim—

1. In a machine for beating out the soles of boots or shoes, a last-carrying support combined with a bed, mold, and press, substantially as set forth, whereby the relative position of the last and press may be changed in a plane transverse to the line or direction of pressure, in order to facilitate the application of pressure to the boot or shoe and its removal from the last.

2. In a machine for beating out boot and shoe soles, the combination of a movable support, bed, last, and self-adjusting mold.

3. The combination of a movable support, *u*, with the main last *u'*, the mold A, and the press.

4. The combination of the movable support *u* and the lasts *u' v* with the mold A and the press.

5. The mold A, connected to the arch-bar of the press by means substantially as described, or the equivalent thereof, whereby such mold is enabled to adjust itself to the sole of the shoe while under pressure.

6. A last provided on its sole with an elastic facing, substantially as set forth.

7. The elastic facing consisting of an india-rubber cushion and a metallic face-plate, in combination with the last, substantially as set forth.

8. The combination of the slide-bar *k*, the wedge *m'*, and the auxiliary treadle-lever *o* with the toggles and their operative pitman and treadle-lever.

9. The combination of the bed *e* with the support for carrying the last, and the device for stopping the support in position beneath the mold, substantially as shown.

10. A last having a base extended toward the toe, substantially as described.

JOSEPH B. JOHNSON.

Witnesses:
GEO. D. NOYES,
ELLIS L. MOTTE.